(12) United States Patent
Jyogan et al.

(10) Patent No.: US 12,133,579 B2
(45) Date of Patent: Nov. 5, 2024

(54) METHOD FOR MANUFACTURING FASTENER STRINGER

(71) Applicant: YKK Corporation, Tokyo (JP)

(72) Inventors: Toshiyuki Jyogan, Kurobe (JP); Takashi Saito, Kurobe (JP)

(73) Assignee: YKK Corporation, Tokyo (JP)

( * ) Notice: Subject to any disclaimer, the term of this patent is extended or adjusted under 35 U.S.C. 154(b) by 16 days.

(21) Appl. No.: 18/343,604

(22) Filed: Jun. 28, 2023

(65) Prior Publication Data

US 2023/0380551 A1 Nov. 30, 2023

Related U.S. Application Data

(62) Division of application No. 17/134,234, filed on Dec. 25, 2020, now Pat. No. 11,744,332.

(30) Foreign Application Priority Data

Dec. 27, 2019 (JP) .................................. 2019-238802
Feb. 5, 2020 (JP) .................................. 2020-017657

(51) Int. Cl.
*A44B 19/00* (2006.01)
*A44B 19/34* (2006.01)
*C11D 3/04* (2006.01)

(52) U.S. Cl.
CPC .............. *A44B 19/34* (2013.01); *C11D 3/044* (2013.01); *C11D 2111/12* (2024.01)

(58) Field of Classification Search
CPC ......... A44B 19/34; A44B 19/42; C11D 3/044; C11D 2111/12; D06L 1/14; D06M 2200/12; D06M 15/564; D06M 13/02; D06M 13/50; D06M 15/643; D06P 5/00; D06P 1/00; D06P 3/00; D06P 5/02; B29D 5/00
USPC ............................................................ 8/636
See application file for complete search history.

(56) References Cited

U.S. PATENT DOCUMENTS

| 3,896,251 A | 7/1975 | Landucci |
| 3,914,827 A | 10/1975 | Brown et al. |
| 3,944,688 A | 3/1976 | Inman |
| 4,111,647 A | 9/1978 | Schleifstein |

(Continued)

FOREIGN PATENT DOCUMENTS

| CN | 103826493 A | 5/2014 |
| CN | 107401064 A | 11/2017 |

(Continued)

OTHER PUBLICATIONS

Office Action, Japanese Patent Application No. 2020-017657, Jan. 10, 2024, 10 pages.

(Continued)

*Primary Examiner* — Eisa B Elhilo
(74) *Attorney, Agent, or Firm* — Kilpatrick Townsend & Stockton LLP

(57) ABSTRACT

A method for manufacturing a fastener stringer according to the present invention, include a dyeing step for dyeing a fastener stringer including an element row fixed to a side edge portion of a tape made of fiber, a dye cleaning step for removing excess dye from the fastener stringer, a water repellent treatment step for adhering a non-fluorine-based water repellent agent to the fastener stringer, and a pre-dyeing degreasing step for degreasing oil and fat adhered to the fastener stringer by a wet process.

8 Claims, 2 Drawing Sheets

(56) References Cited

U.S. PATENT DOCUMENTS

| | | |
|---|---|---|
| 4,112,150 A | 9/1978 | Brown et al. |
| 4,162,892 A | 7/1979 | Leal et al. |
| 4,186,466 A | 2/1980 | Schleifstein |
| 4,543,226 A | 9/1985 | Horita |
| 4,607,425 A | 8/1986 | Terasawa |
| 5,035,029 A | 7/1991 | Horita et al. |
| 6,056,901 A * | 5/2000 | Hamatani ............... B29B 7/60 528/502 A |
| 2006/0016052 A1 | 1/2006 | Horikawa et al. |
| 2008/0152888 A1 | 6/2008 | Tutterow et al. |
| 2008/0189918 A1 | 8/2008 | Kusayama |
| 2008/0257442 A1 | 10/2008 | Horikawa et al. |
| 2010/0325851 A1 | 12/2010 | Han et al. |
| 2012/0011697 A1 | 1/2012 | Kusayama |
| 2013/0067700 A1 | 3/2013 | Kusayama |
| 2015/0201718 A1 | 7/2015 | Fujii et al. |
| 2017/0332744 A1 | 11/2017 | Kameyama et al. |
| 2019/0216143 A1 | 7/2019 | Harris et al. |

FOREIGN PATENT DOCUMENTS

| | | | |
|---|---|---|---|
| CN | 108236164 A | 7/2018 | |
| EP | 0003252 A1 | 8/1979 | |
| EP | 1955608 A2 | 8/2008 | |
| EP | 2638819 B1 * | 7/2017 | ............ D02G 3/34 |
| FR | 2367141 A1 | 5/1978 | |
| JP | S55-102809 U | 7/1980 | |
| JP | S59-080204 A | 5/1984 | |
| JP | S59-202820 A | 11/1984 | |
| JP | 2003047506 A | 2/2003 | |
| JP | 2008-194066 A | 8/2008 | |
| JP | 2010-502858 A | 1/2010 | |
| JP | 2017206789 A | 11/2017 | |
| JP | 2017-214680 A | 12/2017 | |
| KR | 20060046765 A | 5/2006 | |
| WO | WO 2012063333 A1 * | 5/2012 | ............ A44B 19/12 |
| WO | 2016/103426 A1 | 6/2016 | |

OTHER PUBLICATIONS

Office Action, Japanese Patent Application No. 2020-017657, Aug. 17, 2023, 9 pages.

Office Action, Korean Patent Application No. 10-2020-0183669, May 30, 2022, 13 pages.

Office Action, Chinese Patent Application No. 202011559148.0, Oct. 14, 2022, 13 pages.

U.S. Appl. No. 17/134,234, Non-Final Office Action, Jan. 11, 2023, 8 pages.

U.S. Appl. No. 17/134,234, Notice of Allowance, Apr. 21, 2023, 8 pages.

U.S. Appl. No. 17/134,234, Restriction Requirement, Oct. 5, 2022, 6 pages.

European Patent Application No. 20217045.2, Partial European Search Report, May 21, 2021, 15 pages.

* cited by examiner

METHOD FOR MANUFACTURING FASTENER STRINGER

CROSS-REFERENCE TO RELATED APPLICATIONS

This application is a divisional application of U.S. patent application Ser. No. 17/134,234 filed on Dec. 25, 2020, which claims priority to Japanese Patent Application No. 2019-238802 filed on Dec. 27, 2019 and Japanese Patent Application No. 2020-017657 filed on Feb. 5, 2020, all of which are incorporated herein by reference in their entirety.

BACKGROUND

The present invention relates to a method for manufacturing a fastener stringer to which a water repellent agent is adhered by a water repellent treatment, and a water repellent treated fastener chain. Incidentally, the fastener chain is a pair of fastener stringers engaged with each other. In addition, a slide fastener in which a pair of fastener stringers can be opened and closed by a slider is provided.

As a normal manufacturing process of a fastener stringer, for example, as described in Patent Literature 1 and Patent Literature 2, it has been known that after attaching an element row to a tape made of fiber, a heat setting step for stabilizing a shape is performed by using a property of thermal deformation of the element row or the tape, and then a dyeing step is performed.

In addition, various water repellent agents are used to perform a water repellent treatment on a fabric of clothing, and in a case where the water repellent treatment is performed on a fastener chain of a slide fastener that may be used in a part of clothing, a water repellent treatment step is performed after the dyeing step, and for example, Patent Literature 3 and Patent Literature 4 disclose that a water repellent treatment step is performed using a water repellent agent in a fastener chain.

Here, there are various water repellent agents such as a fluorine-based water repellent agent, a silicone-based water repellent agent, and a hydrocarbon-based water repellent agent (for example, a paraffin-based water repellent agent), but the fluorine-based water repellent agent is known to have higher water repellency than water repellent agents that do not use fluorine (hereinafter referred to as "non-fluorine-based water repellent agent"), and are widely used.

Patent Literature 1: JP-A-59-202820
Patent Literature 2: JP-A-2003-47506
Patent Literature 3: JP-A-59-080204
Patent Literature 4: JP-A-2008-194066

SUMMARY

According to one advantageous aspect of the invention, there is provided a method for manufacturing a fastener stringer, the method including:
 a dyeing step for dyeing a fastener stringer including an element row fixed to a side edge portion of a tape made of fiber;
 a dye cleaning step for removing excess dye from the fastener stringer;
 a water repellent treatment step for adhering a non-fluorine-based water repellent agent to the fastener stringer; and
 a pre-dyeing degreasing step for degreasing oil and fat adhered to the fastener stringer by a wet process.

In the dye cleaning step, an excess dyeing assistant may be removed from the fastener stringer in addition to the excess dye.

In the pre-dyeing degreasing step, a degreasing scouring step for removing the oil and fat adhered to the fastener stringer by using a scouring agent may be performed, and a scouring agent cleaning step for cleaning the fastener stringer to remove the scouring agent may be performed after the degreasing scouring step.

The scouring agent may include a surfactant and an alkaline agent.

In the scouring agent cleaning step, hot water may be used to remove the scouring agent and the oil and fat.

The dye cleaning step may include a post-dyeing degreasing-and-cleaning step for degreasing the oil and fat adhered to the fastener stringer and cleaning the excess dye and dyeing assistant by using a soaping agent.

The soaping agent may include a surfactant and an alkaline agent.

The method for manufacturing a fastener stringer may further include a heat setting step for heating the fastener stringer before the pre-dyeing degreasing step.

According to another advantageous aspect of the invention, there is provided a fastener chain including:
 a pair of fastener stringers which include element rows are respectively fixed to facing side edge portions of a pair of tapes made of fiber, wherein a non-fluorine-based water repellent agent is adhered to the fastener chain in a state where the pair of fastener stringers are engaged with each other, and oil and fat contained in the pair of fastener stringers is 0.12 mass % or less with respect to a total mass of the pair of fastener stringers.

The oil and fat contained in the pair of fastener stringers may be 0.08 mass % or less with respect to the total mass of the pair of fastener stringers.

DETAILED DESCRIPTION OF EXEMPLIFIED EMBODIMENTS

Figure 1:
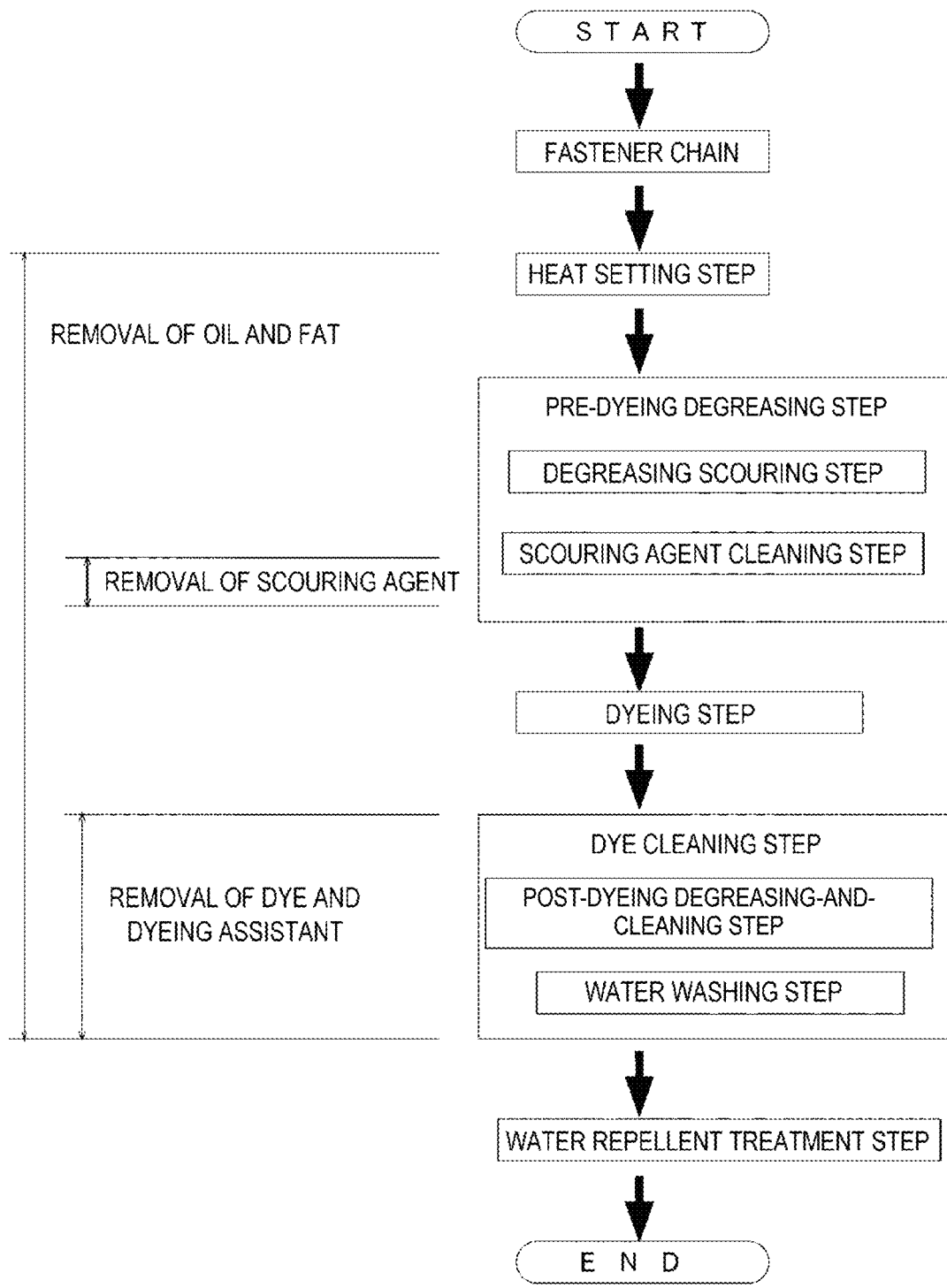
FIG. 1 is a flowchart showing a method for manufacturing a fastener stringer according to a first embodiment of the present invention.

In the field of a slide fastener, a fluorine-based water repellent agent is widely used as a water repellent agent which is most effective for imparting water repellency.

However, in recent years, due to the growing awareness of environmental protection in the entire society, it is required to prevent environmental pollution as much as possible, and also in an apparel industry, it is required to manufacture products by regulating chemical substances that adversely affect the environment. One of the chemical substances to be regulated includes a fluorine compound. From this point of view, as for the water repellent agent used in the fastener chain, it is required to use a fluorine-based one or non-fluorine-based one depending on the intended use.

Incidentally, it is desirable that the water repellent treated fastener chain exhibits a water repellent property equal to or higher than a target standard after washing the set number of times. When a fluorine-based water repellent agent is used, a fastener chain having a water repellent property equal to or higher than the target standard can be obtained by manufacturing the fastener chain by a known manufacturing method of the related art as described in the background art described above, and it has already been put into practical use. However, when the fastener chain using the non-fluorine-based water repellent agent is washed for the set number of times, the water repellent property is lower than the target standard. The present inventors have presumed that the cause of deterioration in the water repellent property of the fastener chain after washing is that the non-fluorine-based water repellent agent has peeled off from the fastener chain.

The present invention has been made in view of the above circumstances, and an object thereof is to suppress deterioration in a water repellent property after washing in a fastener chain (fastener stringer) using a non-fluorine-based water repellent agent as much as possible.

The present inventors have presumed that a non-fluorine-based water-repellent agent is peeled off from a fastener chain after washing because the non-fluorine-based water repellent agent is difficult to adhere to a fastener stringer. Further, the present inventors have presumed that the cause of making the non-fluorine-based water repellent agent difficult to adhere to the fastener stringer is a trace amount of oil and fat contained in the fastener stringer.

The oil and fat contained in the fastener stringer is a trace amount of oil and fat contained in a thread (fiber) or the like of a tape forming the fastener stringer. The oil and fat have evaporated to some extent in a heat setting step as described in the background art above.

However, since the heat setting step is not a step for intentionally evaporating the oil and fat, but is merely a dry and heat-applying step, the oil and fat that have not evaporated, that is, the residual oil and fat is adhered to the fastener stringer. Further, the present inventors have estimated that the residual oil and fat is the cause of making the non-fluorine-based water repellent agent difficult to adhere to the fastener stringer.

Even when the fastener chain is dyed with a fluorine-based water repellent agent, the residual oil and fat is adhered to the fastener stringer, but it is not considered that the oil and fat is a substance causing an influence on water repellency after washing. This is because the fluorine-based water repellent agent has high water repellent property, and therefore satisfies a target standard even after washing the fastener chain.

The adhesion of the oil and fat to the fiber led to the following 1) and 2). 1) A critical surface tension on a fiber surface increases and the water repellency of the fiber decreases. 2) The water repellent agent does not adhere to a portion of the fiber to which the oil and fat is adhered. In view of the above, the present inventors have conceived the following invention.

A method for manufacturing a fastener stringer of the present invention is premised on including a dyeing step for dyeing a fastener stringer including an element row fixed to a side edge portion of a tape made of fiber, a dye cleaning step for removing excess dye from the fastener stringer, and a water repellent treatment step for adhering a non-fluorine-based water repellent agent to the fastener stringer. The water repellent treatment step is performed after the dye cleaning step. The method for manufacturing a fastener stringer of the present invention includes a pre-dyeing degreasing step for degreasing oil and fat adhered to the fastener stringer by a wet process.

The dyeing step may use only the dye or may use a dyeing assistant in addition to the dye. When the dyeing assistant is used, it is desirable to remove the dyeing assistant in order to suppress a decrease in the water repellency after washing as follows.

That is, the dye cleaning step is to remove excess dyeing assistant from the fastener stringer in addition to the excess dye.

The pre-dyeing degreasing step does not matter whether a scouring agent is used, but it is desirable to use a scouring agent in order to remove the oil and fat as much as possible in a short time, and in this case, it is desirable to remove the scouring agent from the fastener stringer as much as possible in order to dye the fastener stringer. For this reason, it is desirable to perform the following.

In the pre-dyeing degreasing step, a degreasing scouring step for removing the oil and fat adhered to the fastener stringer by using a scouring agent is performed, and a scouring agent cleaning step for cleaning the fastener stringer to remove the scouring agent is performed after the degreasing scouring step.

Specific examples of the scouring agent include those containing a surfactant and an alkaline agent.

The scouring agent cleaning step may use, for example, water at room temperature regardless of whether the oil and fat is positively removed, but it is desirable to perform the following in order to positively remove the oil and fat together with the scouring agent.

That is, in the scouring agent cleaning step, hot water is used to remove the scouring agent and the oil and fat.

The dye cleaning step does not matter whether the oil and fat are positively removed, but it is desirable to remove the oil and fat together with the dye and the dyeing assistant in a short time and as much as possible as follows.

In other words, the dye cleaning step includes a post-dyeing degreasing-and-cleaning step for degreasing the oil and fat adhered to the fastener stringer and clean the excess dye and dyeing assistant by using a soaping agent.

Specific examples of the soaping agent include those containing a surfactant and an alkaline agent.

It does not matter whether the heat setting step for heating the fastener stringer is performed before the pre-dyeing degreasing step, but it is desirable to perform the following at least in order to stabilize a shape of the tape among the fastener stringer.

That is, the method for manufacturing a fastener stringer includes a heat setting step for heating the fastener stringer before the pre-dyeing degreasing step.

It is difficult to specify a component and an amount of the oil and fat adhered (contained) to a thread (fiber) because they usually differ depending on the thread manufacturer or the type of thread. However, at present, in the fastener chain that has been subjected to a water repellent treatment with a fluorine-based water repellent agent, the oil and fat contained in the pair of fastener stringers is 0.15 mass % or more with respect to the total mass of the pair of fastener stringers. Therefore, it is desirable to perform the following to facilitate the adhesion of the non-fluorine-based water repellent agent to the fastener stringer.

That is, a fastener chain of the present invention is a pair of fastener stringers in which element rows are respectively fixed to facing side edge portions of a pair of tapes made of fiber. A non-fluorine-based water repellent agent is adhered to the fastener chain in a state where the pair of fastener stringers are engaged with each other, and oil and fat contained in the pair of fastener stringers is 0.12 mass % or less with respect to a total mass of the pair of fastener stringers.

In addition, the oil and fat contained in the pair of fastener stringers is desirably or less with respect to the total mass of the pair of fastener stringers.

Figure 2:
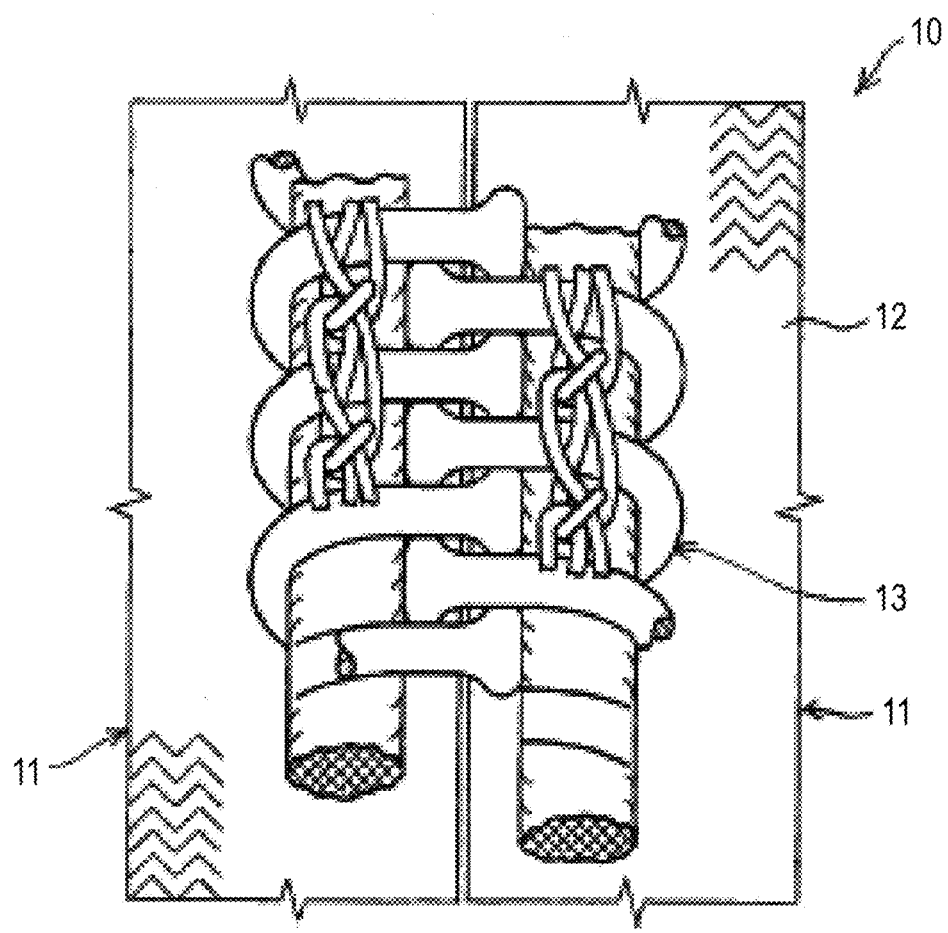
FIG. 2 illustrates an exemplary fastener chain according to an embodiment of the present invention.

As a basic configuration of a slide fastener shown in FIG. 2, the slide fastener includes a pair of fastener stringers 11a, 11b that form a strip shape and face each other in a width direction of the strip and a slider that can open and close the pair of the fastener stringers at facing side edge portions thereof. In addition to the basic configuration of the slide fastener, the slide fastener includes a stopper that stops a movement of the slider at an end portion in a direction in which the pair of fastener stringers close, and an opening tool that can connect and disconnect the pair of fastener stringers at the end portion in a direction in which the pair of fastener stringers open. A state in which the slide fastener is opened is a state in which the pair of fastener stringers are separated at the facing side edge portions, and a state in which the slide fastener is closed is a state in which the pair of fastener stringers are engaged with each other at the facing side edge portions. The state in which the pair of fastener stringers are engaged in this manner is referred to as a fastener chain 10.

The pair of fastener stringers 11a, 11b include a pair of tapes 12 facing each other in the width direction and a pair of element rows 13 fixed to facing side edge portions of the pair of tapes. Further, the fastener stringer includes the tape having a strip shape extending in a straight line and the element row fixed along one side edge portion of the tape. In this way, the fastener stringer has a strip-shape structure in which the element row is fixed, and thus the fastener stringer is elongated. Hereinafter, a long direction of the fastener stringer is referred to as a "longitudinal direction", and a narrow direction (short direction) of the fastener stringer is referred to as a "width direction" as described above.

The tape is strip-shaped and is formed by assembling fiber. Therefore, the tape is made of fiber. Further, a specific example of the tape is a woven fabric or a knitted fabric.

The element row 13 is formed, for example, by a monofilament consisting of elements that are continuous in the longitudinal direction along each of the facing side edge portions of the tapes. The monofilament is, for example, bent into a coil shape, and is made of resin. Incidentally, a core string is inserted into the monofilament. The monofilament is fixed to one surface of the tape in a thickness direction by sewing. Further, in the state of the fastener chain 10, the pair of tapes face each other with a gap therebetween in the width direction, and the pair of element rows are in a state of being engaged with each other at one surface in the thickness direction with respect to the pair of tapes. The engaged state is a state in which elements of one element row and elements of the other element row are engaged with each other.

Oil and fat is originally adhered to a thread for forming a tape, a core string, and a sewing thread for sewing the monofilament (element row) to the tape. The oil and fat is a synthetic oil, a mineral oil for sewing used when sewing an element row to a tape, or the like. Examples of the synthetic oil include a hydrocarbon-based oil (for example, an ester-based and an ether-based), a silicone-based oil, a fluorine-based oil, or the like. In addition, examples of the mineral oil include a hydrocarbon compound derived from underground resources or mixtures containing impurities such as an aromatic hydrocarbon, a paraffinic hydrocarbons, a naphthenic hydrocarbons, or the like.

The thread, the core string, and the sewing thread are, for example, a chemical fiber, a natural fiber, or a combination thereof. More specifically, examples of the synthetic fiber as the chemical fiber include hydrophobic synthetic fiber such as polyester, polypropylene, polyamide, acrylic, vinylon, aramid, acetate, and triacetate. In addition, examples of the natural fiber include cotton, wool, silk, or the like.

In general, a critical surface tension is about 30 dyn/cm to 35 dyn/cm for the oil and fat of the liquid. In addition, in a case of a solid fluorine-based water repellent agent, the critical surface tension is about 20 dyn/cm or less, and in a case of a solid non-fluorine-based water repellent agent, the critical surface tension is about 20 dyn/cm to 30 dyn/cm. As described above, since the oil and fat are closer to the non-fluorine-based water repellent agent than the fluorine-based water repellent agent in terms of the critical surface tension, it can be understood that the non-fluorine-based water repellent agent has an adverse effect when the non-fluorine-based water repellent agent is adhered to the tape.

In a method for manufacturing a fastener stringer of the present invention, the above-mentioned fastener chain is subject to a dyeing treatment and a water repellent treatment. Incidentally, since the fastener chain includes the pair of fastener stringers as described above, by explaining an example of performing the dyeing treatment and the water repellent treatment on the fastener chain, an example of performing the dyeing treatment and the water repellent treatment on the fastener stringer, that is, an example of a method for manufacturing the fastener stringer according to the present invention (first embodiment) will be described below.

As shown in FIG. 1, the fastener stringer according to the first embodiment of the present invention is manufactured by sequentially performing a heat setting step for heating the fastener chain, a pre-dyeing degreasing step for degreasing the oil and fat adhering to the fastener chain by a wet process, a dyeing step for dyeing the fastener chain, a dye cleaning step for removing excess dye and dyeing assistants from the fastener chain, and a water repellent step for adhering a non-fluorine-based water repellent agent to the fastener chain. Each step will be described in detail below.

The heat setting step is, for example, a step for treating a fastener chain under a dry heating condition, as described in Patent Literatures 1 and 2 which are proposed as related art documents. By the heat setting step, a shape of the element row or the tape is stabilized. The oil and fat adhering to the fastener chain are partially evaporated by the heat in the heat setting step. When a fluorine-based water repellent agent is used, it has been found that a sufficient water repellent property can be obtained even in the state of the fastener chain after the heat setting step. However, when a non-fluorine-based water repellent agent is used, it has been clarified by the present inventors that an extremely small amount of oils and fats remaining on the fastener chain after the heat setting step have an adverse effect. Then, the pre-dyeing degreasing step is performed to remove the residual oil and fat adhering to the fastener chain by a wet process.

In the pre-dyeing degreasing step, a degreasing scouring step for removing the oil and fat adhered to the fastener chain by using a scouring agent is performed, and a scouring agent cleaning step for cleaning the fastener chain to remove the scouring agent is sequentially performed after the degreasing scouring step.

In the degreasing scouring step, the oil and fat is dissolved in a heated liquid, for example, an aqueous solution composed of a scouring agent as a solute and water as a solvent is kept at 130° C., and the fastener chain is immersed in the aqueous solution and mixed for minutes. A temperature of the aqueous solution is higher than a room temperature (at least 60° C. or higher), and it is generally considered that the oil and fat are dissolved more easily (degreasing action increases) as the temperature rises higher than the room temperature. The room temperature is a temperature at which a liquid is not heated or cooled.

As the scouring agent, a surfactant and an alkaline agent are used.

The surfactant may be either ionic or nonionic. Among the ionic surfactants, examples of an anionic surfactant include a fatty acid salt, a higher alcohol sulfate ester salt, a liquid fatty acid sulfate ester salt, an alkylallyl sulfonic acid salt, or the like. In addition, examples of the nonionic surfactant include a polyoxyethylene alkyl ether, a sorbitan alkyl ester, a polyoxyethylene sorbitan alkyl ester, or the like.

The alkaline agent is, for example, sodium hydroxide, potassium hydroxide, sodium hydrogen carbonate, ammonia or the like. The aqueous solution is alkaline, and pH is 11 for example.

The oil and fat adhering to the fastener chain is positively removed by the degreasing scouring step. Further, the scouring agent adhering to the fastener chain is removed in the scouring agent cleaning step of the next step.

In the scouring agent cleaning step, the scouring agent is dispersed in the liquid and is flowed, and for example, the fastener chain after the scouring step is mixed for 10 minutes in hot water at 90° C. for 10 minutes, for example. Incidentally, "hot water" means that water at a higher temperature (at least 60° C. or higher) than normal temperature, and it is generally considered that the oil and fat is more easily dissolved (the degreasing action increases) as the temperature rises higher than the normal temperature. The room temperature is a temperature at which a liquid is not heated or cooled.

Since the hot water (heated liquid) is used in a scouring agent removing step, not only the scouring agent adhering to the fastener chain but also the oil and fat are removed. Further, by removing the scouring agent, the pH of the wet fastener chain is brought to a desired value, making it easier to dye the fastener chain in the next dyeing step.

In the dyeing step, the fastener chain is immersed in a dye solution and mixed for a predetermined minute. The dye solution is an aqueous solution composed of a dye and a dyeing assistant as a solute and water as a solvent. In addition, when a disperse dye is used as the dye, a dispersant, a leveling agent, an acid, and a carrier agent are used as the dyeing assistant.

Although the fiber of the fastener chain is dyed to a desired color by this dyeing step, when the dye solution is a hot aqueous solution (when the dye solution is heated), the fastener chain is not only dyed, but also oil and fat is removed. Further, since at least the dye and the dyeing assistant adhere to the fastener chain in the dyeing step, the excess dye and the dyeing assistant are removed in the next dye cleaning step.

In the dye cleaning step, a post-dyeing degreasing-and-cleaning step for degreasing the oil and fat adhered to the fastener stringer and clean the excess dye and dyeing assistant by using a soaping agent, and a water washing step for washing the fastener stringer with water at normal temperature are sequentially performed.

In the post-dyeing degreasing-and-cleaning step, there are cases where water is used as a liquid, an aqueous solution composed of a soaping agent as a solute and water as a solvent is used, and an aqueous solution made of a reducing agent as a solute and water as a solvent is used. When a soaping agent or a reducing agent is used, a disperse dye is used as the dye. When a reducing agent is used, excess disperse dye or dyeing assistant is decomposed by a reduction reaction. In addition, when water is used as the liquid, a normal water-soluble dye is used without using a disperse dye in the dye.

As the soaping agent, a surfactant and an alkaline agent are used.

The surfactant may be either ionic or nonionic. Among the ionic surfactants, examples of an anionic surfactant include a fatty acid salt, a higher alcohol sulfate ester salt, a liquid fatty acid sulfate ester salt, an alkylallyl sulfonic acid salt, or the like. In addition, examples of the nonionic surfactant include a polyoxyethylene alkyl ether, a sorbitan alkyl ester, a polyoxyethylene sorbitan alkyl ester, or the like.

The alkaline agent is, for example, sodium hydroxide, potassium hydroxide, sodium hydrogen carbonate, ammonia or the like. The aqueous solution is alkaline and pH is, for example, 11.

Examples of the reducing agent include stannous chloride, stannous oxalate, stannous acetate, stannous fluoride, hydrosulfite, thiourea dioxide, sodium sulfoxylate-formaldehyde complex typified by Rongalite, formaldehyde sulfoxylic zinc salt typified by dechlorin, or the like.

As a more specific example of the post-dyeing degreasing-and-cleaning step, when using water or an aqueous solution containing a soaping agent in the liquid described above, these liquids are heated and held at 90° C., and the fastener chain is mixed therein for 20 minutes. When an aqueous solution containing a reducing agent is used in the liquid described above, the fastener chain is mixed for 20 minutes in an aqueous solution without heating. An excess dye (disperse dye), dyeing assistant, and oil and fat are removed by the post-dyeing degreasing-and-cleaning step. Then, in the next water washing step, the temperature of the fastener chain is lowered to such a degree that an operator can manually touch the fastener chain to remove the soaping agent and the reducing agent. Next, a water repellent treatment step is performed on the fastener chain.

In the water repellent treatment step, for example, a fastener chain is passed through a liquid containing the water repellent agent as a solute (for example, an aqueous solution containing water as a solvent), and then dried and heat-treated. The water repellent agent adheres to the fiber of the fastener chain by the water repellent treatment step.

The water repellent agent is a non-fluorine-based compound, more specifically a hydrocarbon-based (a compound having a hydrocarbon group, for example, a paraffin-based) or silicone-based compound.

Further, examples of the hydrocarbon-based water repellent agent include those in which a main chain is a polyurethane group and a side chain is a hydrocarbon group.

After the water repellent treatment step, the fastener chain is cut to a desired length, the slider is inserted into the pair of element rows, and the stopper or the opening tool is attached, thereby completing the slide fastener. A portion of the slide fastener that does not include the slider is the fastener chain according to the first embodiment of the present invention. The oil and fat contained in the fastener chain of the first embodiment is 0.12 mass % or less with respect to the total mass of the pair of fastener stringers. This numerical value is a value obtained by rounding a number of the next digit of a display digit. Further, first and second evaluation tests which are grounds for obtaining this numerical value are as follows. The total mass of the pair of fastener stringers is the total mass of the mass of the two fastener stringers forming the fastener chain. Further, the mass of the fastener stringer is the total mass of the mass of the tape, the mass of the element row (including the mass of the core string in the element row) and the mass of the sewing thread (thread that sews the tape and the element row). Therefore, the total mass of the pair of fastener stringers does not include the mass of the slider, the stopper, and the opening tool.

The first evaluation test is a test by a water absorption rate method of JIS L 1907 (JIS: Japanese Industrial Standards). In this test, an evaluation sample is placed in water in an immersion tank and left for 20 minutes, and a water absorption amount of water is measured from a mass change before and after immersion to evaluate water repellency. There are three types of the evaluation sample including of a fastener chain after the heat setting step (among the steps after the heat setting step, the water repellent treatment step are performed without performing the pre-dyeing degreasing step, the dyeing step, and the dye cleaning step), a fastener chain that is not degreased (only the dyeing step, the water washing step and the water repellent treatment step are performed after the heat setting step), and a degreased fastener chain (all steps are performed after the heat setting step). Further, four test samples are used for the evaluation of the fastener chain that is not degreased, and three test samples are used for the evaluation of the degreased fastener chain. Test results are shown in Table 1 below.

TABLE 1

| | Fastener chain after heat setting step | Without degreased | | | | With degreased | | |
|---|---|---|---|---|---|---|---|---|
| | | (1) | (2) | (3) | (4) | (5) | (6) | (7) |
| Water absorption rate | 21.76 | 9.15 | 10.08 | 7.53 | 4.32 | 2.66 | 2.55 | 2.55 |
| Evaluation | X | X | X | X | X | ○ | ○ | ○ |
| Amount of oil and fat | 0.54 | 0.21 | 0.24 | 0.0.24 | 0.22 | 0.10 | 0.12 | 0.12 |

Numbers shown in parentheses in Table 1 indicate evaluation samples of each type. The unit of oil and fat in Table 1 is mass %. In Table 1, O indicates that the evaluation is good, and X indicates that the evaluation is bad. From Table 1, it can be seen that if the oil and fat is 0.12 mass % or less with respect to the total mass of the pair of fastener stringers, a water absorption rate is evaluated to be good. Here, the water absorption rate of 4% is used as a criterion for determining the quality of the evaluation sample, and a water absorption rate of 4% or more is determined as x and a water absorption rate of less than 4% is determined as O. From the results of Table 1, it has been shown that adding a pre-dyeing degreasing step is effective for adhering a non-fluorine-based water repellent agent to the fastener chain.

The second evaluation test is as follows. The evaluation sample is washed for 20 times with JIS L 1930 C4M. After the washing, a spray test of JIS L 1092 is performed to evaluate the water repellency. In JIS L 1092, the following standards are used to evaluate a Grade. From a viewpoint of the quality required at the time of normal use of the slide fastener, it can be assumed as having passed Grade 3 or higher.

Grade 1: total wet.
Grade 2: half wet, with small individual wetting penetrating the fabric.
Grade 3: small individual wet.
Grade 4: not wet, with small water droplets adhered.
Grade 5: not wet, with no water droplets adhered.

There are two types of the evaluation sample including a degreased fastener chain (a fastener chain according to the first embodiment of the present invention) and a fastener chain that is not degreased (the dyeing step, the water washing step, and the water repellent treatment step are performed after the heat setting step). For each type, four evaluation samples are used. The test results are shown in Tables 2 and 3 below.

TABLE 2

| | | With degreased | | | |
|---|---|---|---|---|---|
| | | (8) | (9) | (10) | (11) |
| | Amount of oil and fat | 0.08 | 0.06 | 0.06 | 0.06 |
| The number of times of washing | 5 | 4 | 4 | 4 | 4 |
| | 10 | 4 | 4 | 4 | 4 |
| | 20 | 4 | 3 | 3 | 3 |

TABLE 3

| | | Without degreased | | | | |
|---|---|---|---|---|---|---|
| | | (8') | (9') | (10') | (11') | (12') |
| | Amount of oil and fat | 0.18 | 0.15 | 0.15 | 0.15 | 0.57 |
| The number of times of washing | 5 | 4 | 4 | 4 | 4 | 4 |
| | 10 | 4 | 4 | 4 | 4 | 4 |
| | 20 | 1 | 2 | 2 | 2 | 2 |

Numbers shown in parentheses in Tables 2 and 3 indicate evaluation samples. In addition, the evaluation samples with the same number in the numbers shown in parentheses are manufactured under the same conditions except with or without being degreased. The degreased ones among the evaluation samples are indicated by only the numbers shown in parentheses in Table 2, and those without being degreased among the evaluation samples are displayed by adding a symbol "'" to the upper right of the numbers shown in parentheses in Table 3. The units of oil and fat in Tables 2 and 3 are mass %.

It can be seen from the results of Table 2 that all the evaluation samples that are degreased are Grade 4 or higher before the evaluation test (before washing) and are Grade 3 or higher after the evaluation test. It can be seen from the results of Table 3 that all the evaluation samples that are not degreased are Grade 4 or higher before the evaluation test and are Grade 2 or lower after the evaluation test. Therefore, also from the results of Tables 2 and 3, it has been shown that adding the pre-dyeing degreasing step is effective for adhering the non-fluorine-based water repellent agent to the fastener chain.

Here, in Tables 1, 2, and 3, the mass % of the oil and fat is calculated by weighing a fastener chain completed through a series of manufacturing steps such as a step for suturing the element row on the tape with a sewing thread, a dyeing step and a water repellent treatment step after completion. Further, an amount of the oil and fat adhering to the sewing thread and the element row is affected by some variations depending on the fastener manufacturing process other than the pre-dyeing degreasing step. However, from the tests of Tables 1, 2, and 3, it is confirmed that the mass % of the oil and fat can be reduced to 0.12 mass % or less by adding the pre-dyeing degreasing step, and conversely, it is confirmed that mass % or more of the oil and fat can remain if the pre-dyeing degreasing step is not added.

A third evaluation test is performed in addition to the first and second evaluation tests described above. In the third evaluation test, a spray test of JIS L 1092 is performed before washing to evaluate the water repellency. The third evaluation test is to determine whether a scouring agent, a dyeing assistant, and a reducing agent affect the water repellency before washing. The test results are shown in Table 4 below.

after the evaluation test, which is higher than Grade 3. It can be seen from the results of the evaluation samples 13, 14 that the pre-dyeing degreasing step is effective.

An evaluation sample 15 is a sample that is subjected to the pre-dyeing degreasing step and the dyeing step using the dyeing assistant after the heat setting step, but is not subjected to the dye cleaning step, and is Grade 2 after the evaluation test, which is worse than Grade 3. It can be seen from the results of the evaluation samples 14, 15 that the dyeing step using the dyeing assistant (at least one of the dye and the dyeing assistant) adversely affects the water repellency after washing.

An evaluation sample 16 is a sample that is subjected to the dyeing step using the dyeing assistant and the dye cleaning step (the post-dyeing degreasing-and-cleaning step with water without using the soaping agent and the water washing step) after the heat setting step, and is Grade 2 after the evaluation test, which is worse than Grade 3. It can be seen from the results of the evaluation samples 15, 16 that when the dyeing step using the dyeing assistant is performed, the presence or absence of the dye cleaning step without using the soaping agent does not affect the water repellency after washing, and the dyeing step using the dyeing assistant adversely affects the water repellency after washing, as in the results of the evaluation samples 14, 15.

TABLE 4

|  |  | Dyeing assistant | Dyeing assistant | Soaping agent | Scouring | Washing with hot water | Dye | Washing with hot water | Water washing | Reduction | Water washing | Evaluation |
|---|---|---|---|---|---|---|---|---|---|---|---|---|
| Trial production | (13) | — | — | — | — | — | — | — | — | — | — | Grade 2 |
|  | (14) | — | — | ○ | ○ | — | — | — | — | — | — | Grade 4 |
|  | (15) | with | — | ○ | ○ | ○ | — | — | — | — | — | Grade 2 |
|  | (16) | with | without | ○ | ○ | ○ | ○ | ○ | — | — | — | Grade 2 |
|  | (17) | without | without | ○ | ○ | ○ | ○ | ○ | — | — | — | Grade 4 |
|  | (18) | with | without | ○ | ○ | ○ | ○ | ○ | ○ | ○ | — | Grade 4 |
|  | (19) | with | with | ○ | ○ | ○ | ○ | ○ | — | — | — | Grade 4 |

In Table 4, "-" indicates that nothing is done. The numbers shown in parentheses 13 to 19 in Table 4 indicate evaluation samples. In Table 4, "scouring" indicates the degreasing scouring step, and "washing with hot water" adjacent to the right of the "scouring" indicates the scouring agent cleaning step. In Table 4, "washing with hot water" adjacent to the right with respect to "dyeing" indicates that the post-dyeing degreasing-and-cleaning step is performed by heating the water (at 90° C.), and "water washing" adjacent to the right shows the "water washing step" performed after the post-dyeing degreasing-and-cleaning step. In addition, "reduction" in Table 4 means a "reduction step" using a reducing agent, and "water washing" adjacent to the right with respect to "reduction" indicates the "water washing step" performed after the reduction step. In Table 4, "dyeing" indicates the dyeing step using a disperse dye.

An evaluation sample 13 is a sample subjected to a water repellent treatment step after the heat setting step. However, the evaluation sample 13 is an evaluation sample that is not subjected to the pre-dyeing degreasing step, the dyeing step, and the dye cleaning step, that is, an evaluation sample in which the oil and fat still remains adhered, and is Grade 2 after the evaluation test (after washing), which is worse than Grade 3.

An evaluation sample 14 is a sample that is subjected to the pre-dyeing degreasing step and the water repellent treatment step after the heat setting step, but is not subjected to the dyeing step and the dye cleaning step, and is Grade 4

The evaluation sample 16 serves as an evaluation standard for the evaluation samples 17 to 19.

An evaluation sample 17 differs from the evaluation sample 16 in that the dyeing assistant is not used in the dyeing step, and is Grade 4 after the evaluation test, which is higher than Grade 3. It can be seen from the results of the evaluation samples 16, 17 that when the dyeing assistant is used in the dyeing step, the water repellency after washing is more adversely affected as compared with the case where the dyeing assistant is not used in the dyeing step, that is, the dyeing assistant has an more adverse effect on the water repellency after washing.

An evaluation sample 18 differs from the evaluation sample 16 in that the cleaning step using the reducing agent and the subsequent water washing step are performed in the dye cleaning step, and is Grade 4 after the evaluation test, which is higher than Grade 3. It can be seen from the results of the evaluation samples 16, 18 that when the dyeing assistant is used in the dyeing step, the positive removal of the dyeing assistant and the reducing agent by performing the degreasing and cleaning step with the reducing agent and the subsequent water washing step has a positive effect on the water repellency after washing.

An evaluation sample 19 differs from the evaluation sample 16 in that the soaping agent is used in the post-dyeing degreasing-and-cleaning step, and is Grade 4 after the evaluation test, which is higher than Grade 3. It can be seen from the results of the evaluation samples 16, 19 that when the dyeing assistant is used in the dyeing step, the positive removal of the dyeing assistant using the soaping agent has a positive effect on the water repellency after washing.

The present invention is not limited to the above embodiment, and can be appropriately modified without departing from the scope thereof. For example, in the above embodiment, the dye solution is an aqueous solution composed of a dye and a dyeing assistant as a solute and water as a solvent, but the present invention is not limited thereto, and an aqueous solution composed of a dye as a solute and water as a solvent may be used. In this case, in the dye cleaning step, excess dye is removed from the fastener stringer.

As described in the above, according to the present invention, since the amount of the oil and fat contained in the fastener stringer is small, the non-fluorine-based water repellent agent is likely to adhere to the fastener stringer, and deterioration in the water repellent property after washing can be suppressed as much as possible.

What is claimed is:

1. A method for manufacturing a fastener stringer, the method comprising:
   a dyeing step for dyeing a fastener stringer including an element row fixed to a side edge portion of a tape made of fiber;
   a dye cleaning step for removing excess dye from the fastener stringer;
   a water repellent treatment step for adhering a non-fluorine-based water repellent agent to the fastener stringer; and
   a pre-dyeing degreasing step for degreasing oil and fat adhered to the fastener stringer by a wet process.

2. The method for manufacturing a fastener stringer according to claim 1, wherein
   in the dye cleaning step, an excess dyeing assistant is removed from the fastener stringer in addition to the excess dye.

3. The method for manufacturing a fastener stringer according to claim 1, wherein
   in the pre-dyeing degreasing step, a degreasing scouring step for removing the oil and fat adhered to the fastener stringer by using a scouring agent is performed, and a scouring agent cleaning step for cleaning the fastener stringer to remove the scouring agent is performed after the degreasing scouring step.

4. The method for manufacturing a fastener stringer according to claim 3, wherein
   the scouring agent includes a surfactant and an alkaline agent.

5. The method for manufacturing a fastener stringer according to claim 3, wherein
   in the scouring agent cleaning step, hot water is used to remove the scouring agent and the oil and fat.

6. The method for manufacturing a fastener stringer according to claim 1, wherein
   the dye cleaning step includes a post-dyeing degreasing-and-cleaning step for degreasing the oil and fat adhered to the fastener stringer and cleaning the excess dye and dyeing assistant by using a soaping agent.

7. The method for manufacturing a fastener stringer according to claim 6, wherein
   the soaping agent includes a surfactant and an alkaline agent.

8. The method for manufacturing a fastener stringer according to claim 1, further comprising:
   a heat setting step for heating the fastener stringer before the pre-dyeing degreasing step.

* * * * *

UNITED STATES PATENT AND TRADEMARK OFFICE
CERTIFICATE OF CORRECTION

PATENT NO. : 12,133,579 B2
APPLICATION NO. : 18/343604
DATED : November 5, 2024
INVENTOR(S) : Toshiyuki Jyogan et al.

Page 1 of 1

It is certified that error appears in the above-identified patent and that said Letters Patent is hereby corrected as shown below:

In the Specification

In Column 5, Line 2, before "or" insert -- 0.08 % --.

In Column 6, Line 66, before "minutes." insert -- 20 --.

In Columns 9 and 10, after Line 24 in TABLE 1, delete

"
|  | Fastener chain after heat setting step | Without degreased | | | | With degreased | | |
| --- | --- | --- | --- | --- | --- | --- | --- | --- |
|  |  | (1) | (2) | (3) | (4) | (5) | (6) | (7) |
| Water absorption rate | 21.76 | 9.15 | 10.08 | 7.53 | 4.32 | 2.66 | 2.55 | 2.55 |
| Evaluation | X | X | X | X | X | O | O | O |
| Amount of oil and fat | 0.54 | 0.21 | 0.24 | 0.0.24 | 0.22 | 0.10 | 0.12 | 0.12 |

" and insert --

|  | Fastener chain after heat setting step | Without degreased | | | | With degreased | | |
| --- | --- | --- | --- | --- | --- | --- | --- | --- |
|  |  | (1) | (2) | (3) | (4) | (5) | (6) | (7) |
| Water absorption rate | 21.76 | 9.15 | 10.08 | 7.53 | 4.32 | 2.66 | 2.55 | 2.55 |
| Evaluation | X | X | X | X | X | O | O | O |
| Amount of oil and fat | 0.54 | 0.21 | 0.24 | 0.24 | 0.22 | 0.10 | 0.12 | 0.12 |

--.

In Column 11, Line 16, before "mass" insert -- 0.15 --.

Signed and Sealed this
Twenty-second Day of April, 2025

Coke Morgan Stewart
*Acting Director of the United States Patent and Trademark Office*